Aug. 11, 1959     O. G. BURCH     2,898,633
METHOD OF FORMING HOLLOW PLASTIC ARTICLES
Filed July 21, 1953     2 Sheets-Sheet 1
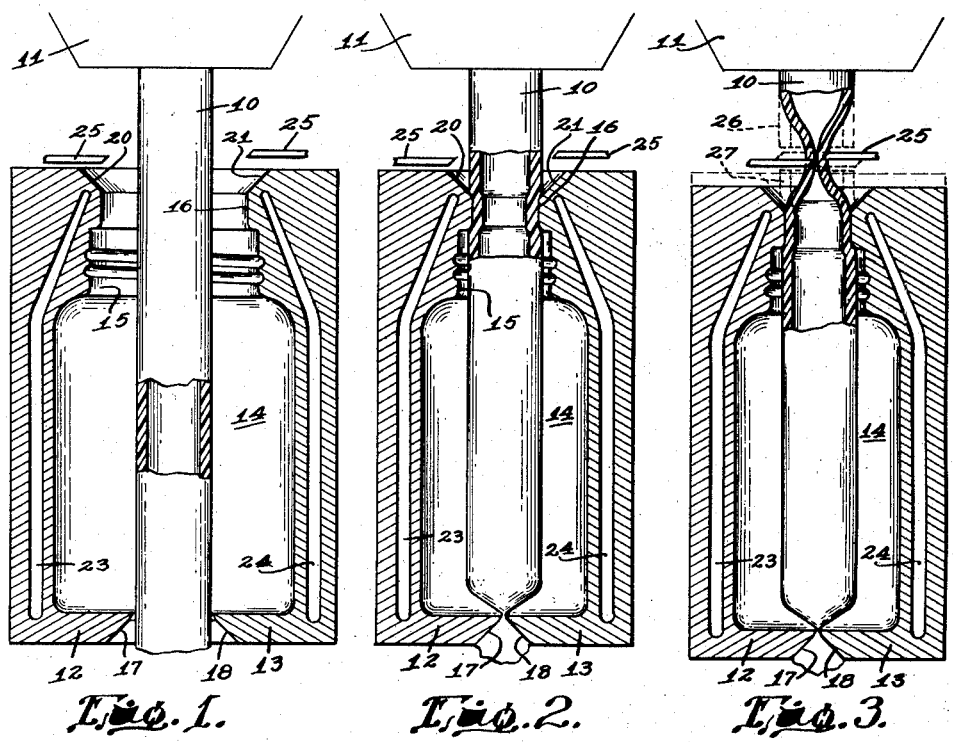
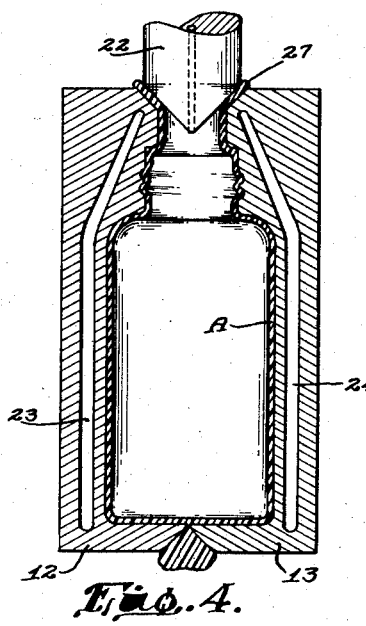
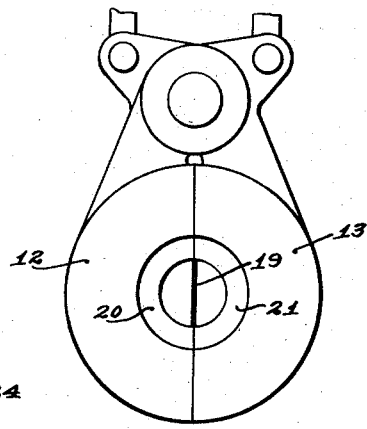
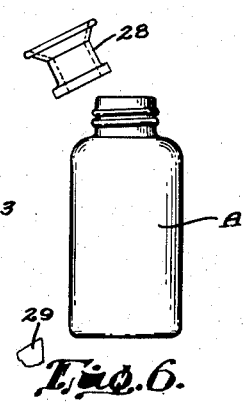
Inventor
OSCAR G. BURCH
By Rule and Hoge,
Attorneys Aug. 11, 1959  O. G. BURCH  2,898,633
METHOD OF FORMING HOLLOW PLASTIC ARTICLES
Filed July 21, 1953  2 Sheets-Sheet 2
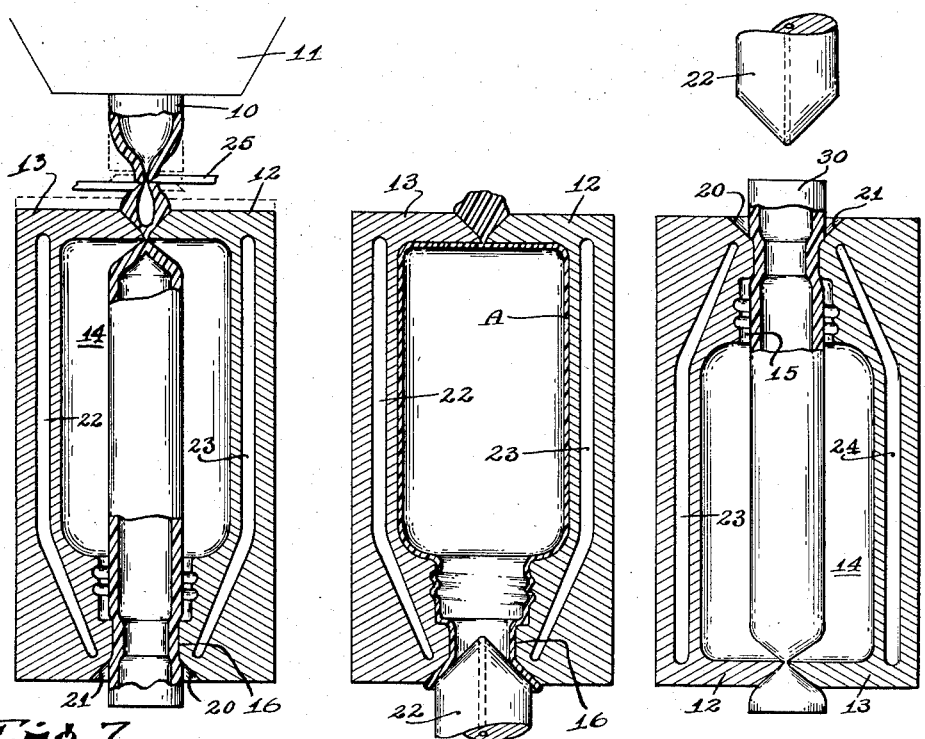
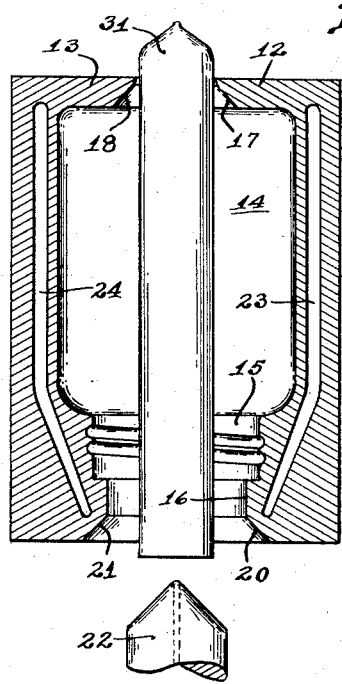
Inventor
OSCAR G. BURCH
By Rule and Hoge
Attorneys

United States Patent Office 2,898,633
Patented Aug. 11, 1959

2,898,633

METHOD OF FORMING HOLLOW PLASTIC ARTICLES

Oscar G. Burch, Toledo, Ohio, assignor to Owens-Illinois Glass Company, a corporation of Ohio Application July 21, 1953, Serial No. 369,275

16 Claims. (Cl. 18—55)

This invention relates to the manufacture of hollow articles and, more particularly, hollow articles having a neck opening and made of thermoplastic materials.

It is an object of this invention to provide a novel method of making hollow plastic articles from plastic tubing, which tubing is in a condition of plasticity to permit expansion and setting in predetermined form.

Another object of the invention is to provide such a method of making hollow plastic articles, which articles require a minimum of trimming.

Other objects of the invention will appear hereinafter.

Basically, the invention in one of its forms comprises providing plastic tubing in a condition of plasticity, sealing one end of the tubing by closing a mold about the tubing, severing the other end of the tubing quickly to leave the ends open, and expanding the tubing in the mold by applying fluid under pressure through the open end of the tubing.

Referring to the accompanying drawings:

Figs. 1 to 4 inclusive are elevational sectional views through a mold at various steps of the method;

Fig. 5 is a top plan view of a mold which may be used in performing the invention;

Fig. 6 is an elevational view of a container made according to the invention, showing a portion which is trimmed;

Figs. 7 and 8 are elevational sectional views through a mold at various steps in a modification of the method;

Fig. 9 is an elevational sectional view through a mold at a step in a further modification of the method; and Fig. 10 is an elevational sectional view through a mold at a step in a further modification of the method.

As shown in Fig. 1, plastic hollow tubing 10 in continuously introduced by extrusion from extrusion nozzle 11 between the sections 12, 13 of a partible mold. When closed, the sections of the mold form a cavity 14, a neck opening 15, and a neck extension 16. The neck extension has a slightly lesser diameter than the neck opening for reasons presently described. The bottom of the mold sections are bevelled at 17, 18 and slightly spaced apart at 19 when the mold is closed (Fig. 5) in order to seal the tubing. The top of the mold sections are bevelled at 20, 21 to receive a blowhead 22. Cooling fluid channels 23, 24 may be provided in the body of the mold sections.

According to the method, the tubing 10 is in a condition of plasticity to permit expansion and setting in predetermined form. After a length of the tubing is extruded between the sections 12, 13 of the mold (Fig. 1), the sections of the mold are closed, sealing the leading end of the tubing by the bevelled surfaces 17, 18 (Fig. 2). The mold is constructed to tightly pinch the tubing and make it easy to trim the excess plastic (Fig. 5). Simultaneously with the sealing of the leading end of the tubing, the tubing is lightly gripped by the surfaces of the neck extension 16 which has a diameter slightly less than the diameter of the tubing.

Next, the tubing in the mold is severed from the portion being extruded by shears 25 (Fig. 3). It is critical to this method of forming plastic containers that the severed ends 26, 27 reopen (dotted lines) after the severing step. If the step is performed quickly the ends will reopen, due to the elastic memory of the plastic material, but if the severing step is performed slowly the ends will be squeezed together and sealed. It is therefore important that the severing step should be performed quickly or in such a manner that the end of the tubing being extruded is left open. To aid in the reopening of the ends and to compensate for the continuous extrusion of the tubing, it is preferred to quickly move the mold axially away from the point of extrusion simultaneously with the severing operation. This movement is shown by the dotted lines in Fig. 3.

A blowhead 22 is then brought into the open end of the tubing (Fig. 4) and the tubing is expanded to the walls of the mold by fluid under pressure.

After being molded, the resultant article A is trimmed by removing the excess portions 28, 29 (Fig. 6).

It should also be noted that the axial movement of the mold during the severing of the tubing is required to compensate for the high rates of extrusion normally encountered. In instances where the rate of extrusion is low, the axial movement may not be required.

A modification of the method may be performed by inverting the mold relative to the extrusion nozzle 11, as shown in Figs. 7 and 8. In the modified method, the tubing is pinched and sealed by the end of the mold and quickly severed above the mold to leave the severed ends open. If required, the mold may be moved axially during the severing step to insure the reopening of the severed ends. The leading end of the tubing may be lightly gripped by the neck extension 16. After the tubing is enclosed in the mold and severed, it is expanded in the mold by applying fluid pressure through the open end by means of a blowhead 22.

The invention has been described as used with tubing that is being extruded but it should be apparent that a modification may be made as shown in Figs. 9, 10 with use on tubing in the required condition of plasticity, for example, tubing that is preformed and subsequently reheated to the required condition of plasticity.

In the use of this modified method where a piece of tubing 30 is supplied to the mold sections, one end of the tubing must be open, namely, the end through which the tubing is expanded by the blowhead. Thus it is possible to supply a piece of tubing 31 in the required condition of plasticity with one end open and the other end closed as shown in Fig. 10.

The invention has been described as applicable to thermoplastic material. The term thermoplastic as used herein is used to define any organic material which has the required condition of plasticity to permit expansion and setting in predetermined form.

Modifications may be resorted to within the spirit and scope of the appended claims.

I claim:

1. The method of forming hollow plastic articles which comprises introducing a substantially continuous extrusion of tubing of plastic material outwardly from an extrusion orifice into the open sections of a partible mold, said tubing being in a condition of plasticity to permit expansion and setting in predetermined form, moving said mold in the direction of the extrusion and sealing said tubing at one portion thereof by closing the sections of the mold, severing simultaneously with said mold movement the tubing in the mold from the remaining tubing in such a manner as to leave the severed ends open, the resultant tubing in the mold having one end open and the other end closed, and expanding the tubing in the mold to the walls of the mold by applying fluid under pressure through the open end of the portion of the tubing in the mold.

2. The method of forming hollow plastic articles which comprises substantially continuously introducing tubing of plastic material to the open sections of a partible mold, said tubing being in a condition of plasticity to permit expansion and setting in predetermined form, sealing said tubing at one portion thereof by closing sections of the partible mold about said tubing, lightly gripping the tubing along the length thereof simultaneously with the closing of the mold, quickly severing the tubing in the mold from the remainder of the tubing, moving the mold axially in the direction of movement of the tubing simultaneously with the severing to compensate for the continuous movement of the tubing, and thereby leaving the severed ends of the tubing open, the resultant tubing in the mold having one end open and the other end closed, and expanding the tubing in the mold to the walls of the mold by applying fluid under pressure through the open end of the portion of the tubing in the mold.

3. The method of forming hollow plastic articles having an opening, which method comprises continuously introducing tubing of plastic material to the open sections of a partible mold, said tubing being in a condition of plasticity to permit expansion and setting in predetermined form, sealing the leading end of said tubing by closing the sections of the partible mold about said tubing, lightly gripping the other end of the tubing simultaneously with the closing of the mold, quickly severing the tubing in the mold from the remainder of the tubing, thereby leaving the severed ends of the tubing open, moving the mold axially in the direction of movement of the tubing substantially simultaneously with the severing sufficiently to compensate for the continuous movement of the tubing, and expanding the tubing to the walls of the mold by applying fluid under pressure through the open end of the severed portion of the tubing in the mold.

4. The method of forming hollow plastic articles having an opening, which method comprises continuously extruding plastic material outwardly from an orifice in tubular form, enclosing a portion of plastic tubing in a partible mold, said tubing being in a condition of plasticity to permit expansion and setting in predetermined form, sealing an end of the tubing and simultaneously lightly gripping the tubing at one portion along the length thereof by closing the partible mold, moving said closed mold in the direction of the extrusion while severing the portion of the tubing in the mold from the remaining tubing in such a manner as to leave the severed ends of the tubing open, and expanding the tubing in the mold by applying fluid under pressure through the open end of the tubing in the mold.

5. The method which consists in continuously downwardly extruding tubing of thermoplastic material in a condition of plasticity to permit expansion and setting in predetermined form, enclosing a section of the extruded tube in a partible closable mold whose axis coincides substantially with that of the tubing at the point of its initial formation, sealing and gripping said tubing at one portion thereof by the closing action of the mold, gripping another portion of the tube in the mold coincident with the sealing of the tubing, quickly severing the tube section within the mold from the remainder of the tube and substantially coincident with the completion of such severing moving the mold along the downward direction of extrusion to thereby space apart the severed ends of the tubing and leave said ends free to open, the tube section in the mold having one end open and the other end closed, and expanding the tube section in the mold by introducing fluid under pressure through the open end.

6. The method of forming hollow plastic articles having an opening, which method comprises continuously extruding plastic material outwardly from an orifice, introducing the substantially continuous tubing of plastic material to the open sections of a partible mold, said tubing being in a condition of plasticity to permit expansion and setting in predetermined form, the leading end of said tubing being open, sealing said tubing at a point along the length thereof by closing the sections of the mold, moving said mold in the direction of the extrusion while severing the tubing in the mold from the remaining tubing in such a manner as to leave the severed ends of said remaining tubing open, and expanding the tubing in the mold to the walls thereof by applying fluid under pressure through its open end portion.

7. The method of forming hollow plastic articles having an opening, which method comprises continuously extruding plastic material outwardly from an orifice, introducing the substantially continuous tubing of plastic material to the open sections of a partible mold, said tubing being in a condition of plasticity to permit expansion and setting in predetermined form, the leading end of said tubing being open, sealing said tubing at a point along the length thereof by closing the sections of the mold, lightly gripping the tubing near the leading end thereof simultaneously with the closing of the mold, moving said mold and tubing in the direction of the extrusion while severing the tubing in the mold from the remaining tubing in such a manner as to leave the severed ends of said remaining tubing open, and expanding the tubing in the mold to the walls thereof by applying fluid under pressure through its open end portion.

8. The method of forming hollow plastic articles having an opening, which method comprises extruding a tube of plastic material, said tube being in a condition of plasticity to permit expansion and setting in predetermined form, the leading end of said tubing being open, sealing said tubing at a point along the length thereof by closing the sections of a partible mold about said tube, moving said mold and tubing in the direction of the extrusion while severing the tubing in the mold from the remainder of the tube being extruded in such a manner as to leave the severed end of the extruding tubing open, and expanding the tubing in the mold to the walls thereof by applying fluid under pressure through the open end of the portion of the tubing in the mold.

9. The method of forming hollow plastic articles having an opening, which method comprises extruding a tube of plastic material, said tube being in a condition of plasticity to permit expansion and setting in predetermined form, the leading end of said tubing being open, sealing said tubing at a point along the length thereof by closing the sections of a partible mold about said tube, engaging the tubing near the leading end thereof simultaneously with the closing of the mold, moving said mold and tubing in the direction of the extrusion while severing the tubing in the mold from the remainder of the tube being extruded in such a manner as to leave the severed end of the extruding tubing open, and expanding the tubing in the mold to the walls thereof by applying fluid under pressure through the open end of the portion of the tubing in the mold.

10. The method of forming hollow plastic articles having an opening, which method comprises extruding a tube of plastic material, said tube being in a condition of plasticity to permit expansion and setting in predetermined form, the leading end of said tube being open, sealing said tube at a point along the length thereof by closing the sections of a partible mold about said tube, engaging the tube near the leading end thereof simultaneously with the closing of the mold, quickly severing the tubing in the mold from the remainder of the tube being extruded, moving the mold axially away from the point of extrusion simultaneously with the severing to compensate for the continuous extrusion of the tubing, thereby leaving the severed end of the tubing being extruded open, and expanding the tubing to the walls of the mold by applying fluid under pressure through the open end of the severed portion of the tubing in the mold.

11. The method of forming hollow plastic articles comprising continuously extruding tubing of thermoplastic material through an orifice, said tube being in a condition of plasticity to permit expansion and setting in predetermined form, the leading end of said tubing being open, enclosing a section of the extruded tube in a partible and closeable mold, sealing said tube at one portion thereof by the closing action of the mold, passing a severing element through the tubing between the mold and the extrusion orifice in such a manner as to leave the severed end of the tubing open, relatively moving the mold in the direction of the extrusion substantially coincidentally with the completion of such severing and at a speed at least as great as the speed of extrusion to thereby space apart the severed open ends of the tubing, and expanding the tubing in the mold to the walls thereof by applying fluid under pressure through the open end of the portion of the tubing in the mold.

12. The method of forming hollow plastic articles comprising continuously extruding tubing of thermoplastic material, said tubing being in a condition of plasticity to permit expansion and setting in predetermined form, the leading end of said tubing being open, pinching and sealing said tubing at a point spaced therealong from said open end, passing a severing element through the tubing at a point therealong between the pinched area and the point of origin of said tubing in such manner as to leave open the new leading end of the extruding tubing, relatively moving the severed length of tubing in the direction of extrusion and at a higher rate than the rate of extrusion to space apart the severed ends, and expanding said severed length of tubing in a mold by fluid pressure introduced through its open end.

13. The method of forming hollow plastic articles comprising continuously extruding from an orifice tubing of thermoplastic material, said tubing being in a condition of plasticity to permit expansion and setting in predetermined form, the leading end of said tubing being open, pinching and sealing said tubing at one region along its length, passing a severing element through the tubing at a point behind the pinched portion and spaced from the extrusion orifice in such a manner as to leave open the severed ends, coincident with said severing moving the severed length of tubing relative to the extruder in the direction of extrusion and at a higher rate than the rate of extrusion, and expanding said severed length of tube in a mold by fluid pressure introduced through its open end.

14. The method of forming hollow plastic articles comprising substantially continuously extruding through an orifice tubing of thermoplastic material, said tubing being in a condition of plasticity to permit expansion and setting in predetermined form, the leading end of said tubing being open, engaging said tubing with a partible mold, passing a severing element through the extruded tubing at a point behind said engagement by the mold and spaced from the orifice in such a manner as to leave open the severed end of the tubing, substantially coincidentally with severing relatively moving the mold in the direction of the extrusion to space apart the severed ends of the tubing, sealing said severed length of tubing at a point thereon within said mold, and expanding the tubing in the mold to the walls of the mold by applying fluid under pressure through said open end of the mold enclosed tubing.

15. The method of forming hollow plastic articles comprising issuing a hollow open-ended substantially tubular formation of thermoplastic material from an orifice, said material of the issued formation being in a condition of plasticity to permit expansion and setting in predetermined form, engaging said issued formation at at least one point, quickly severing a length of the formation intermediate said engagement and the orifice and in such a manner as to leave the severed ends of said formation open, substantially coincident with said severing moving the engaged and severed length of the formation away from the orifice to space apart said severed ends of said formation, pinching and sealing said severed length at a point thereon within molding apparatus, and expanding the severed length to the walls of the molding apparatus by applying fluid under pressure through the open end of said severed length.

16. The method of claim 15, wherein the open end through which the fluid under pressure is applied is the trailing end of the severed length.

References Cited in the file of this patent

UNITED STATES PATENTS

| | | |
|---|---|---|
| 1,800,324 | Shipley | Apr. 14, 1931 |
| 2,288,454 | Hobson | June 30, 1942 |
| 2,541,249 | Hobson | Feb. 13, 1951 |
| 2,597,558 | Bailey | May 20, 1952 |
| 2,669,752 | Pratt | Feb. 23, 1954 |